(12) United States Patent
Frey et al.

(10) Patent No.: US 7,758,955 B2
(45) Date of Patent: Jul. 20, 2010

(54) MINERAL INSULATION ELEMENT AND PROCESS FOR PRODUCING IT

(75) Inventors: Emmo Frey, Dachau (DE); Berit Straube, Linthe (DE)

(73) Assignee: Xella Dämmsysteme GmbH, Stulln (DE)

( * ) Notice: Subject to any disclaimer, the term of this patent is extended or adjusted under 35 U.S.C. 154(b) by 986 days.

(21) Appl. No.: 11/342,959

(22) Filed: Jan. 30, 2006

(65) Prior Publication Data

US 2006/0177368 A1 Aug. 10, 2006

(30) Foreign Application Priority Data

Feb. 4, 2005 (DE) ......................... 10 2005 005 259

(51) Int. Cl.
*B32B 3/26* (2006.01)
*C04B 38/10* (2006.01)

(52) U.S. Cl. ................. 428/312.4; 428/312.2; 106/672; 106/679; 106/705; 106/712; 106/737; 252/62

(58) Field of Classification Search .................. 252/62; 106/672, 679, 705, 713, 737; 428/312.2, 428/312.4

See application file for complete search history.

(56) References Cited

U.S. PATENT DOCUMENTS 4,171,985 A * 10/1979 Motoki et al. ................. 501/84

| | | | | |
|---|---|---|---|---|
| 7,465,350 B2 * | 12/2008 | Uzawa et al. | ............... | 106/640 |
| 2004/0107872 A1 * | 6/2004 | Matsuyama et al. | ......... | 106/638 |

FOREIGN PATENT DOCUMENTS

| CH | 231 859 | 4/1944 |
|---|---|---|
| DE | 25 57 689 | 6/1977 |
| DE | 69218182 T2 | 7/1992 |
| DE | 101 31 360 A1 | 1/2003 |
| EP | 0069095 | 1/1983 |
| EP | 0 186 847 B1 | 2/1991 |
| EP | 0573654 A1 | 12/1993 |
| EP | 1055648 A1 | 11/2000 |

OTHER PUBLICATIONS

Translation of DE 10131360, Frey et al, Jan. 9, 2003.*

* cited by examiner

*Primary Examiner*—Hai Vo
(74) *Attorney, Agent, or Firm*—Brinks Hofer Gilson & Lione

(57) ABSTRACT

A mineral, aluminum-blown insulation element, in particular insulation slab, comprising calcium silicate hydrates as framework and blown pores surrounded by the framework, wherein more than 40% by volume, in particular more than 50% by volume, of the blown pores have a diameter of less than 1 mm and more than 75% by volume, in particular more than 85% by volume, of the blown pores have a diameter of less than 2 mm and the thermal conductivity $\lambda_{10dr}$ is preferably less than 0.045 W/mK.

32 Claims, 1 Drawing Sheet

MINERAL INSULATION ELEMENT AND PROCESS FOR PRODUCING IT

CROSS REFERENCE TO RELATED APPLICATION

This application claims priority to German Patent Application No. 10 2005 005 259.2-45, filed Feb. 4, 2005.

FIELD OF THE INVENTION

The invention relates to an aluminum-blown mineral insulation element, e.g. an insulation slab, an insulation beam or another three-dimensional shape, also as loose material, of a type including calcium silicate hydrates as framework-forming and strength-imparting mineral phases. The invention also relates to a process for producing the insulation element.

BACKGROUND AND SUMMARY OF THE INVENTION

In the production of mineral insulation elements, a low thermal conductivity (TC) and a low bulk density combined with a relatively high mechanical strength are sought.

DE 101 31 360 A1 describes a process for producing porous concrete insulation slabs comprising aluminum in the form of paste as pore former, with, for example, bulk densities of from 100 to 120 kg/m³ being achieved at a thermal conductivity of λ=0.045 W/mK and a compressive strength of 0.5 N/mm².

In the case of blowing by means of aluminum, e.g. in the form of aluminum powder or paste, pores which have been blown to a different extent occur in the cast fresh compositions with decreasing distance from the surface as a result of the decreasing hydrostatic pressure. The porosity distribution in the insulation elements obtained is thus not homogeneous. The relatively large pores prevent thermal conductivities of less than, for example, 0.045 W/mK from being achieved.

In addition, relatively large blown pores are obtained, so that, for this reason too, the desired relatively low thermal conductivities cannot be achieved.

It is an object of the present invention to provide a mineral aluminum-blown insulation element which is bound by means of calcium silicate hydrate and has a low thermal conductivity of, in particular, less than 0.045 W/mK and a high strength combined with a low bulk density, in particular from an inexpensive mix, and also a process for producing it.

This object is achieved by the compositions and methods of this invention.

To achieve the objects of this invention, an attempt was firstly made to bring about formation of small pores by use of finer aluminum particles than usual, e.g. in a paste or in the form of a powder. However, it was found that the finer aluminum particles are strongly agglomerated before the reaction with water which forms hydrogen bubbles, leading to even larger pores than when aluminum particles having a customarily used particle size are used.

The invention has therefore taken a novel, nonobvious route by using generally platelet-like aluminum particles of customary fineness and inhibiting bubble formation and/or ensuring that the aluminum particles are largely deagglomerated and attached to solid particles of the suspension of the fresh composition. This results in formation of smaller blown pores than in processes of the prior art, so that smaller thermal conductivities can also be achieved and, in addition, smaller bulk densities can be made available at adequate to very good strengths.

The invention accordingly provides for the use of agents which develop small blown pores by, for example, an affinity of aluminum particles or small aluminum particle agglomerates present in the aluminum products to the solid particle surface in the suspension of the fresh composition being produced and a certain degree of bonding being effected. Instead of this or in combination therewith, agents which have a deagglomerating action in respect of the aluminum particles can also be used. As a result, the formation of blown pores is surprisingly inhibited or hindered in such a way that the different hydrostatic pressure in a suspension is largely without influence. For the purposes of the invention, the agents will also be referred to below as "blown pore inhibitors".

BREIF DESCRIPTION OF THE DRAWINGS

DETAILED DESCRIPTION OF THE INVENTION

Figure 1:
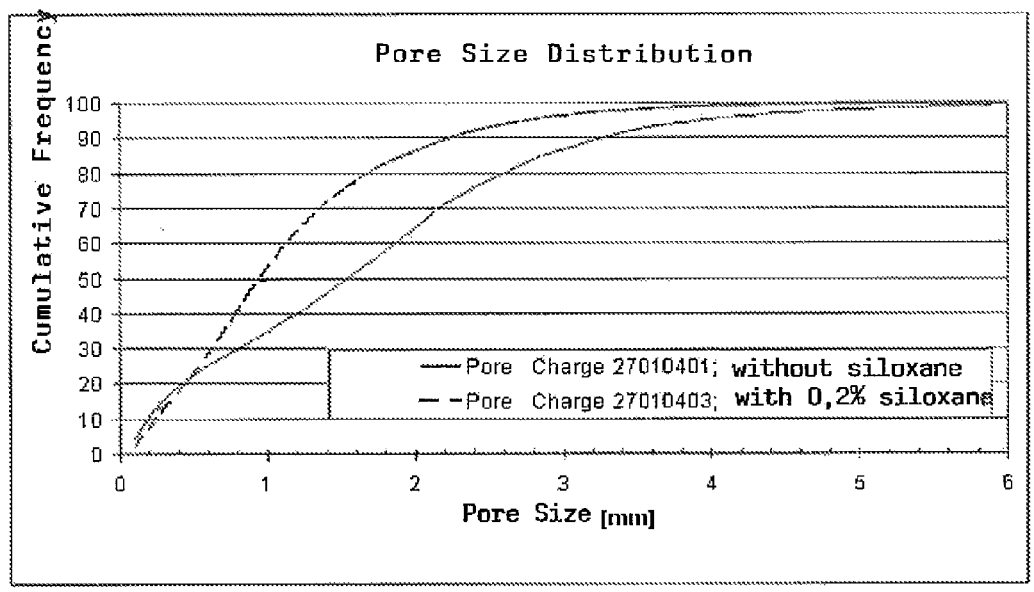
FIG. 1 shows the cumulative frequency distribution of blown pore sizes for two examples of compositions in accordance with the invention.

The sought-after formation of relatively small blown pores, in particular pores of uniform size, is achieved particularly well in accordance with this invention when using tetrafunctional olysiloxanes. These polysiloxanes are described, for example, in EP 186847 B1. These are alkylsilicone resins bearing alkoxy groups and containing an amino-functional polydimethylsiloxane. In addition to the polydimethylsiloxane chains typical of siloxanes, they also contain trimethoxy and tetraethoxy groups on the silicon and, in the fully reacted state, have a network structure which makes them suitable for attachment to siliceous solid surfaces. They thus comprise tetrafunctional groups together with bifunctional and trifunctional groups.

The product which is preferably used for the purposes of the invention is the product SMK 1311, or Wacker BS SMK 1311 from Wacker Chemie, GmbH in Burghausen, Germany, which, as a product comprising a tetrafunctional polysiloxane, is particularly effective for forming small gas bubbles from aluminum particles according to the invention. Compounds of the type described will hereinafter be referred to as "tetrafunctional polysiloxanes" for short.

They have hitherto been used, for example, for making foam concrete, gypsum plaster and water-borne paints, for example, water repellent, as dispersants in the polymerization of monomers and in applications in which organic silicon compounds can be used in water-diluted form.

In customary insulation slab formulations, which are known to differ significantly from foam concrete formulations, the tetrafunctional polysiloxanes obviously develop completely different properties compared to the known properties. In fresh mixtures for insulation slabs, the tetrafunctional polysiloxanes obviously develop the property of effecting formation of relatively small bubbles, possibly by attaching themselves to, in particular, mineral particle surfaces and giving the particle surface an affinity to aluminum particles.

A person skilled in the art will know how to select compounds which are most suitable for the inhibition of bubble formation or for the possible generation of an affinity of the mineral particle surfaces for metallic aluminum from among the many polysiloxanes disclosed in EP 186847 B1, in particular in combination with the additional compounds mentioned there, e.g. salts of water-soluble organic or inorganic acids and organic silicon compounds containing basic nitrogen, by simple experimentation.

On the basis of the teachings of the present invention, a person skilled in the art will be able to find further agents which have the appropriate effect on aluminum particles and/or further agents which hinder or inhibit bubble or blown pore formation in the reaction of the aluminum particles or the relatively small agglomerates of aluminum particles present in the customarily used aluminum products with water.

The process of the invention makes it possible to produce mineral insulation elements which are bound by calcium silicate hydrate and have, in particular, a bulk density in the range from 75 to 110 kg/m$^3$ using finely divided aluminum, in particular in the form of customarily used aluminum paste known per se as porosity-generating agent, with more than 40% by volume, in particular more than 50% by volume, of the blown pores having a diameter of less than 1.0 mm and more than 75% by volume, in particular more than 85% by volume, of the blown pores having a diameter of less than 2.0 mm, in particular at a total porosity of from 90 to 98% by volume, in particular from 95 to 97% by volume. For example, platelet-like aluminum particles having a customary fineness, e.g. a $d_{50}$ of from 32 to 35 µ are used in the paste.

When carrying out the process of the invention, a fresh mixture for insulation elements is obtained by, for example, mixing:
  water
  at least one hydraulic binder component, e.g. portland cement
  at least one reactive $SiO_2$ component, e.g. quartz flour
  at least one reactive CaO component, e.g. quicklime and/or slaked lime,
  at least one sulfate carrier, e.g. gypsum or anhydrite,
  at least one finely divided aluminum, in particular aluminum paste and/or powder,
  at least one agent which inhibits blown pores, and also
  if desired, customary aggregates such as ground limestone, fly ash, ground foam concrete or ground insulation slabs and
  if desired, customary additives.

As blown pore inhibitor, use is made of, in particular, the above-described tetrafunctional polysiloxane.

The blown pore inhibitor is advantageously added before the addition of the aluminum and preferably before or during the addition of the cement to the mixture. The aluminum is added subsequently. The aluminum particles presumably attach themselves to the solid particle surface which is coated with the blown pore inhibitor and has, due to the blown pore inhibitor, acquired an affinity to aluminum during stirring of the mixture.

It is thus possible to introduce the aluminum particles which are not agglomerated or barely agglomerated in the aqueous aluminum paste into the strongly alkaline mixture largely without agglomeration even though the alkaline medium greatly alters the surface charge of aluminum, so that the emulsifier of the pH-neutral Al paste is no longer in an environment which meets the original prerequisites for dispersion of the aluminum particles. Preference is given to using an aluminum paste as described in DE-C-2557689. It advantageously comprises up to 80% by weight of aluminum together with water and an emulsifier.

The aqueous mixture for the insulation elements is introduced into a casting mold and blown and allowed to set in a customary way. Elements are cut from the set block after removal from the mold and these are cured in a conventional manner in an autoclave, preferably until tobermorite is present as main mineral binder phase in the insulation elements.

The content of tetrafunctional polysiloxane in the mixture is preferably from 0.1 to 0.4% by weight, particularly preferably from 0.2 to 0.3% by weight. The content is based on the solids in the mixture.

Preferred mixtures to be cured hydrothermally are obtained from the following compositions. Here, the content of the individual components in the mixture is given in percent by weight based on the solids in the mixture. In addition, the content of $SiO_2$, CaO and $SO_3$ is in each case based on the pure component, i.e. the reactive constituent responsible for the function in the mixture. Thus, for example, the $SiO_2$ component is reported on the basis of its $SiO_2$ equivalent, i.e. the amount of the $SiO_2$ component weighed out is such that the total amount of $SiO_2$ corresponds to the amount of pure quartz flour which would give the appropriate content. Correspondingly, the content of the CaO component is based on the CaO equivalent, and that of the $SO_3$ component is based on the $SO_3$ equivalent. The finenesses are indicated in Blaine values.

| | |
|---|---|
| Hydraulic binder component (fineness: 2000-5000 cm$^2$/g) | 30-50% by weight, in particular 35-45% by weight |
| $SiO_2$ component (fineness: 5000-12 000 cm$^2$/g, in particular 8000-11 000 cm$^2$/g) | 15-45% by weight, in particular 20-40% by weight |
| CaO component | 5-15% by weight, in particular 8-12% by weight |
| $SO_3$ component | 3-7% by weight, in particular 4-6% by weight |
| Aluminum paste | 0.5-1% by weight, in particular 0.6-0.7% by weight |
| Blown pore inhibitor | 0.1-0.4% by weight, in particular 0.2-0.3% by weight |
| Ground rock and/or other inert or pozzolanic aggregates (fineness: 2000-5000 cm$^2$/g) | 0-30% by weight, in particular 15-25% by weight |
| Additives Water/solids ratio | 0-1% by weight 1.2-1.5, in particular 1.3-1.4 |

An inventive aluminum-blown insulation element bound by means of calcium silicate hydrate preferably has a bulk density in the range from 75 to 110 kg/m$^3$, with more than 40% by volume, in particular more than 50% by volume, of the blown pores being smaller than 1.0 mm and more than 75% by volume, in particular more than 85% by volume, being smaller than 2.0 mm. The total porosity is preferably in the range from 90 to 98% by volume, in particular from 95 to 97% by volume, and the proportion of the total porosity made up by blown pores is preferably from 80 to 90% by volume, in particular from 83 to 87% by volume. The blown pore sizes are determined, for example, by optical microscopy on polished sections (cf., for example, FIG. 2). In contrast, in known insulation slabs only about 35% by volume of the pores are smaller than 1 mm. The total porosity is made up of the blown pores surrounded by the calcium silicate hydrate framework and capillary pores within the framework. The thermal conductivity of the insulation elements of the invention is preferably not more than $\lambda_{10dr}$=0.045 W/mK, preferably not more than $\lambda_{10dr}$=0.042 W/mK, and is, for example, in the range from 0.040 to 0.041 W/mK at a bulk density of from 90-110 kg/m$^3$, preferably 100-105 kg/m$^3$, and, for example, in the range from 0.038 to 0.039 W/mK at a bulk density of 80-90 kg/m$^3$, in particular 83-86 kg/M$^3$. ($\lambda_{10dr}$ is the thermal conductivity in the dry state at 10° C.)

Tetrafunctional polysiloxane obviously inhibits bubble formation and thus the blowing action of aluminum so that although a higher degree of porosity is achieved at bulk densities in the range from 75 to 110 kg/m$^3$, the blown pores in the mixture remain relatively small during blowing and do not combine to form larger pores. The size and number of the blown pores and thus the bulk density and thermal conductivity and also the strength can be controlled in a targeted manner via the amount of blown pore inhibitor added. A relatively large amount of the blown pore inhibitor reduces the size of the blown pores to a greater extent than does a smaller amount. Correspondingly, the number of blown pores increases since the total volume of blown pores does not change. Within the preferred range of the added amount, the desired small blown pore sizes are achieved without the formation of blown pores or their growth being suppressed to such an extent that high bulk densities and thus high thermal conductivities are obtained.

It is advantageous firstly to pretreat a mineral constituent of the water-solids suspension which is not a hydraulic binder, for example quartz flour or ground limestone, with the blown pore inhibitor, mix it and subsequently add it to the water-solids suspension. In this case too, the blown pore inhibitor has the effect that more than 40% by volume, in particular more than 50% by volume, of the blown pores in the resulting insulation slabs are smaller than 1 mm and more than 75% by volume, in particular more than 85% by volume, of all blown pores are smaller than 2 mm, at a bulk density of the insulation slabs of, for example, from 85 kg/m$^3$ to 100 kg/m$^3$. This is particularly surprising in the case of the treatment of ground limestone with a tetrafunctional polysiloxane, since siloxanes are only known to react on siliceous surfaces, for example surfaces of fly ashes or quartz flour. A corresponding interaction with calcite has not been reported hitherto.

The reactive SiO$_2$ component is used in the conventional, high fineness of 5000-12000 cm$^2$/g, in particular 8000-11000 cm$^2$/g, determined by the Blaine method, to ensure complete reaction to form calcium silicate hydrates, in particular tobermorite, in the hydrothermal curing in an autoclave. Since the fine SiO$_2$ component, in particular quartz flour, is complicated to produce and is therefore expensive, the quartz flour is, according to the invention, advantageously partly replaced by inexpensive ground rock, e.g. ground limestone, having a fineness of 2000-5000 cm$^2$/g, as a result of which the costs of a mix for mineral insulation elements can be reduced while retaining almost unchanged the good properties.

The proportion of the CaO component and the hydraulic binder component in the mix is preferably reduced in such a way that despite the replacement of the reactive SiO$_2$ component by ground rock, the ratio of reactive, particularly in hydrothermal curing, CaO to SiO$_2$ remains unchanged.

In an advantageous variant of the process of the invention, the aggregates ground foam concrete or ground insulation slabs are used sundried with the usual high moisture content without the formulation being adversely affected thereby. This saves time-consuming and costly drying processes and shows that the blown pore inhibitor can probably couple to the surface despite coating of the particle surface with water molecules and displays the inventive blown pore inhibiting action.

The invention is illustrated below by means of three examples.

EXAMPLE 1

In a first example, quartz flour and anhydrite are mixed with water in ratios indicated in Table 1 below. The percentages shown in Table 1 are percentages by weight. A product comprising tetrafunctional polysiloxane, namely SMK 1311 from Wacker, Burghausen, is subsequently added in a proportion of 0.2% by weight, based on the total solids. 0.7% by weight of aluminum as a paste comprising Al particles in a fineness of $d_{50}$=32-35 µm is then mixed in. Portland cement and quicklime (CaO) are subsequently added to the mixture in the amounts shown in Table 1 and are stirred into the mixture. The water/solids ratio is 1.3. The mixture is then introduced into customary casting molds and blown and allowed to set. After 24 hours, the resulting set but still plastic molded cakes are taken from the molds by means of vacuum suckers and cut into slabs by means of wires. The slabs are subsequently autoclaved and thereby cured.

TABLE 1

| | |
|---|---|
| Quartz flour | 38.5% by weight |
| Portland cement | 45.5% by weight |
| Quicklime | 10.5% by weight |
| Anhydrite | 5.5% by weight |

EXAMPLE 2

In a comparative mixture of a second example, the same constituents of the mixture as in the first example are mixed in the same mixing ratios and the same order, once again in a water/solids ratio of 1.3, but without addition of a blown pore inhibitor, and processed to produce insulation slabs.

The results of the two examples are shown in FIG. 1. FIG. 1 shows the cumulative frequency distribution of the blown pore size of the insulation slab produced using tetrafunctional polysiloxane as described in the first example (broken line) and of the blown pore size of the insulation slab produced without tetrafunctional polysiloxane as described in the second example (continuous line).

It can be seen from FIG. 1 that 53% by volume of all blown pores of the inventive insulation slabs with tetrafunctional polysiloxane have a diameter of less than 1 mm and 87% by volume have a diameter of less than 2 mm. The dry bulk density of the slab is 102 kg/m$^3$, and the $\lambda_{10dr}$ value is 0.0404 W/mK.

In contrast, only 35% by volume of all blown pores in the insulation slabs obtained in the second example are smaller than 1 mm and 65% by volume are smaller than 2 mm (continuous curve). The dry bulk density is 104 kg/m$^3$; the thermal conductivity $\lambda_{10dr}$ is 0.0441 W/mK and thus about 10% above the value for the insulation slabs produced by the process of the invention.

Figure 2:
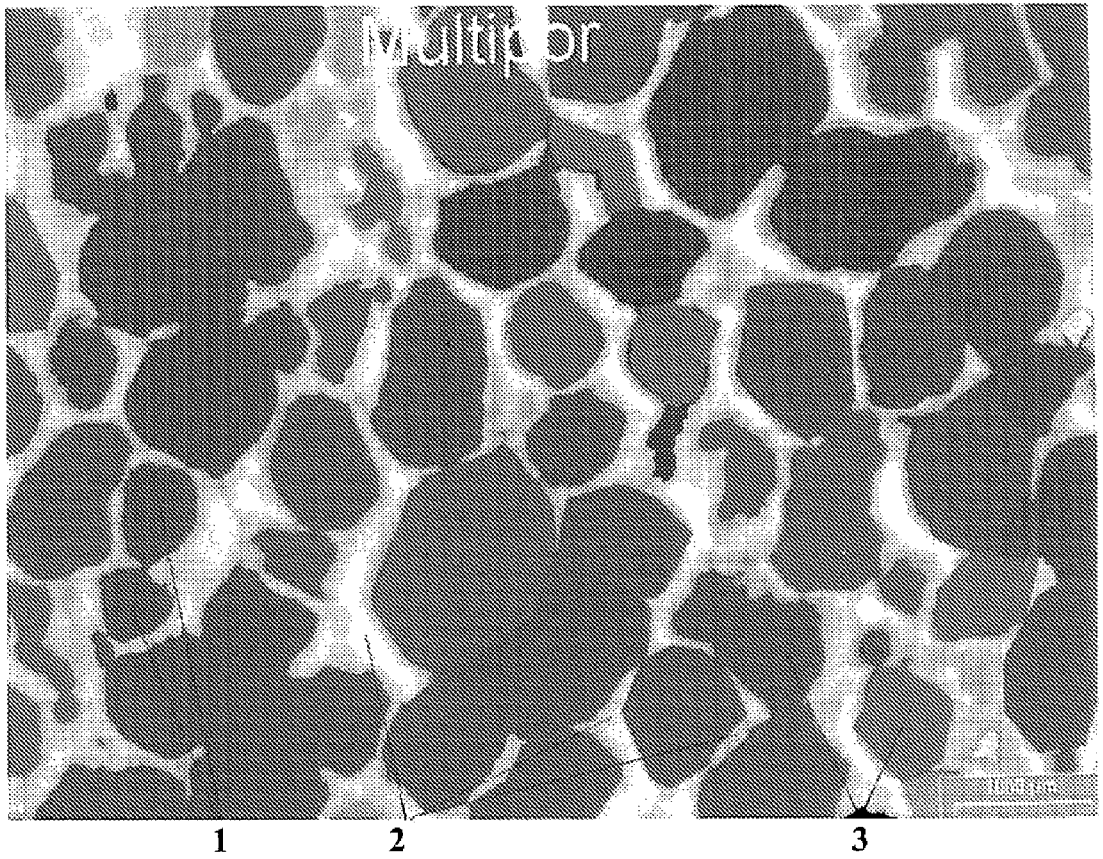
FIG. 2 is an image obtained by optical microscopy on polished sections of a first example of a composition in accordance with the present invention from which blown pore sizes are determined.

The uniformity of the blown pores of the insulation slab produced as described in the first example can be seen from FIG. 2. FIG. 2 shows an optical micrograph of an insulation slab produced as described in the first example. Blown pores 1 are separated from one another by struts 2. Micropores in the struts 2 cannot be seen at the present magnification, but are present. 86% by volume of the total porosity of the insulation element is made up of blown pores 1, and 14% by volume is made up of micropores. It can be seen that the size of the essentially spherical blown pores is uniform and that a large part of the blown pores have a diameter of less than 1 mm. The total porosity is 95-97% by volume.

EXAMPLE 3

In a third example, part of the quartz flour in a mixture as described in the first example is replaced by ground limestone having a fineness of 3000 cm²/g determined by the Blaine method, with the CaO content and the portland cement content being reduced so that the ratio of reactive CaO to $SiO_2$ remains the same as in the mixture shown in Table 1. The precise composition of the mixture in terms of the mineral constituents is shown in Table 2.

TABLE 2

| | |
|---|---|
| Quartz flour | 23.8% by weight |
| Ground limestone | 25.0% by weight |
| Portland cement | 37.0% by weight |
| Quicklime | 9.5% by weight |
| Anhydrite | 4.7% by weight |

Insulation slabs whose blown pores once again have a very uniform size distribution are obtained. More than 50% by volume of the blown pores are smaller than 1 mm and more than 75% by volume are smaller than 2 mm.

While the above description constitutes the preferred embodiment of the present invention, it will be appreciated that the invention is susceptible to modification, variation and change without departing from the proper scope and fair meaning of the accompanying claims.

The invention claimed is:

1. A mineral, aluminum-blown insulation element, comprising calcium silicate hydrates as a framework and blown pores surrounded by the framework, wherein more than 40% by volume of the blown pores have a diameter of less than 1 mm and more than 75% by volume of the blown pores have a diameter of less than 2 mm and the thermal conductivity $\lambda_{10dr}$ of the element is less than 0.045 W/mK, wherein the bulk density of the element is from 75 kg/m³ to 110 kg/m³ and wherein the total porosity of the element is from 90% to 98% by volume, wherein from 80% to 90% by volume of the total porosity is made up by blown pores, wherein the blown pores are generated by an aluminum foaming agent.

2. The insulation element as claimed in claim 1, wherein the thermal conductivity $\lambda_{10dr}$ of the element is between 0.042 W/mK and 0.045 W/mk.

3. The insulation element as claimed in claim 1, wherein the thermal conductivity $\lambda_{10dr}$ of the element is less than 0.042 W/mK.

4. The insulation element as claimed in claim 1, wherein a ground rock is present in the element.

5. The insulation element as claimed in claim 4, wherein the content of the ground rock present in the element is up to 30% by weight.

6. The insulation element as claimed in claim 4, wherein the round rock has a fineness of from 2000 cm²/g to 5000 cm²/g.

7. The insulation element as claimed in claim 4, wherein the ground rock is ground limestone.

8. The insulation element as claimed in claim 1, wherein the compressive strength of the element is in the range from 0.20 N/mm² to 0.41 N/mm².

9. The insulation element as claimed in claim 1, wherein the main mineral phase of the framework is tobermorite.

10. The insulation element as claimed in claim 1, wherein the thermal conductivity $\lambda_{10dr}$ of the element at a bulk density of 90 kg/m³ to 110 kg/m³ is in the range from 0.040 W/mK to 0.041 W/mK.

11. The insulation element as claimed in claim 1, wherein the thermal conductivity $\lambda_{10dr}$ of the element at a bulk density of 80 kg/m³ to 90 kg/m³ is in the range from 0.038 W/mK to 0.039 W/mK.

12. The insulation element as claimed in claim 1, wherein a tetrafunctional polysiloxane is present in the element.

13. The insulation element as claimed in claim 12, wherein the tetrafunctional polysiloxane is present in the element in an amount of 0.1%-0.4% by weight.

14. The insulation element as claimed in claim 1, wherein the element is produced by the process of providing a mixture including water, at least one reactive $SiO_2$ component, at least one hydraulic binder component, at least one reactive CaO component, at least one $SO_3$ component, finely divided aluminum for development of blown pores, allowing the mixture to set, and hydrothermally curing the mixture, wherein at least one agent which inhibits blown pore development is added before the addition of the aluminum.

15. The insulation element as claimed in claim 14, wherein the agent which inhibits blown pore development is added before or during the addition of the hydraulic binder component.

16. The insulation element as claimed in claim 14, wherein an agent comprising tetrafunctional polysiloxane is provided as the agent which inhibits blown pore development.

17. The insulation element as claimed in claim 16, wherein a tetrafunctional polysiloxane, in particular a tetrafunctional polysiloxane is provided as the agent which inhibits blown pore development.

18. The insulation element as claimed in claim 16, wherein the tetrafunctional siloxane is added to the mixture in an amount of from 0.1% to 0.4% by weight.

19. The insulation element as claimed in claim 14, wherein ground limestone is added as ground rock to the mixture.

20. The insulation element as claimed in claim 14, wherein a ground rock having a fineness of 2000 cm²/g to 5000 cm²/g is used as part of the mixture.

21. The insulation element as claimed in claim 14, wherein quartz flour is added to the mixture.

22. The insulation element as claimed in claim 21, wherein the ratio of the reactive, CaO to the reactive $SiO_2$ is set so that tobermorite is formed as a main mineral phase during the hydrothermal curing.

23. The insulation element as claimed in claim 14, wherein the reactive $SiO_2$ component is provided having a fineness of 5000 cm²/g to 12,000 cm²/g.

24. The insulation element as claimed in claim 14, wherein a hydraulic binder component having a fineness of 2000 cm²/g to 5000 cm²/g is used.

25. The insulation element as claimed in claim 14, wherein from 15% to 45% by weight of the $SiO_2$ component is used, up to 30% by weight of ground rock is used, from 30% to 50% by weight of hydraulic binder component is used, from 5% to 15% by weight of the CaO component is used, and from 3% to 7% by weight of the $SO_3$ is used and also from 0% to 1% by weight of additives are added to the mixture.

26. The insulation element as claimed in claim 14, wherein the finely divided aluminum is added to the mixture in an amount of from 0.5% to 1% by weight based on the solids content.

27. The insulation element as claimed in claim 14, wherein finely divided aluminum having a $d_{50}$ of 32 μm to 35 μm is used.

28. The insulation element as claimed in claim 14, wherein finely divided aluminum in the form of aluminum paste is used.

29. The insulation element as claimed in claim 14, wherein a mineral constituent of the mixture which is not a hydraulic binder is mixed with the blown pore inhibitor before addition to the mixture.

30. The insulation element as claimed in claim 14, wherein water is added to the mixture in such an amount that a water/solids ratio of from 1.2 to 1.5 is provided.

31. The insulation element as claimed in claim 14, wherein the mixture is poured into a casting mold and, after setting to form a block having sufficient green strength, is cut into individual elements and subsequently cured to form the insulation elements.

32. The insulation element of claim 1, wherein the insulation element is an insulation slab.

* * * * *